July 21, 1959     L. V. SORG ET AL     2,895,807
MULTIPLE STREAM GAS ANALYZER

Filed July 22, 1957     4 Sheets-Sheet 1

Inventors:
Leonard V. Sorg
John C. Lamkin
By Everett A. Johnson
Attorney

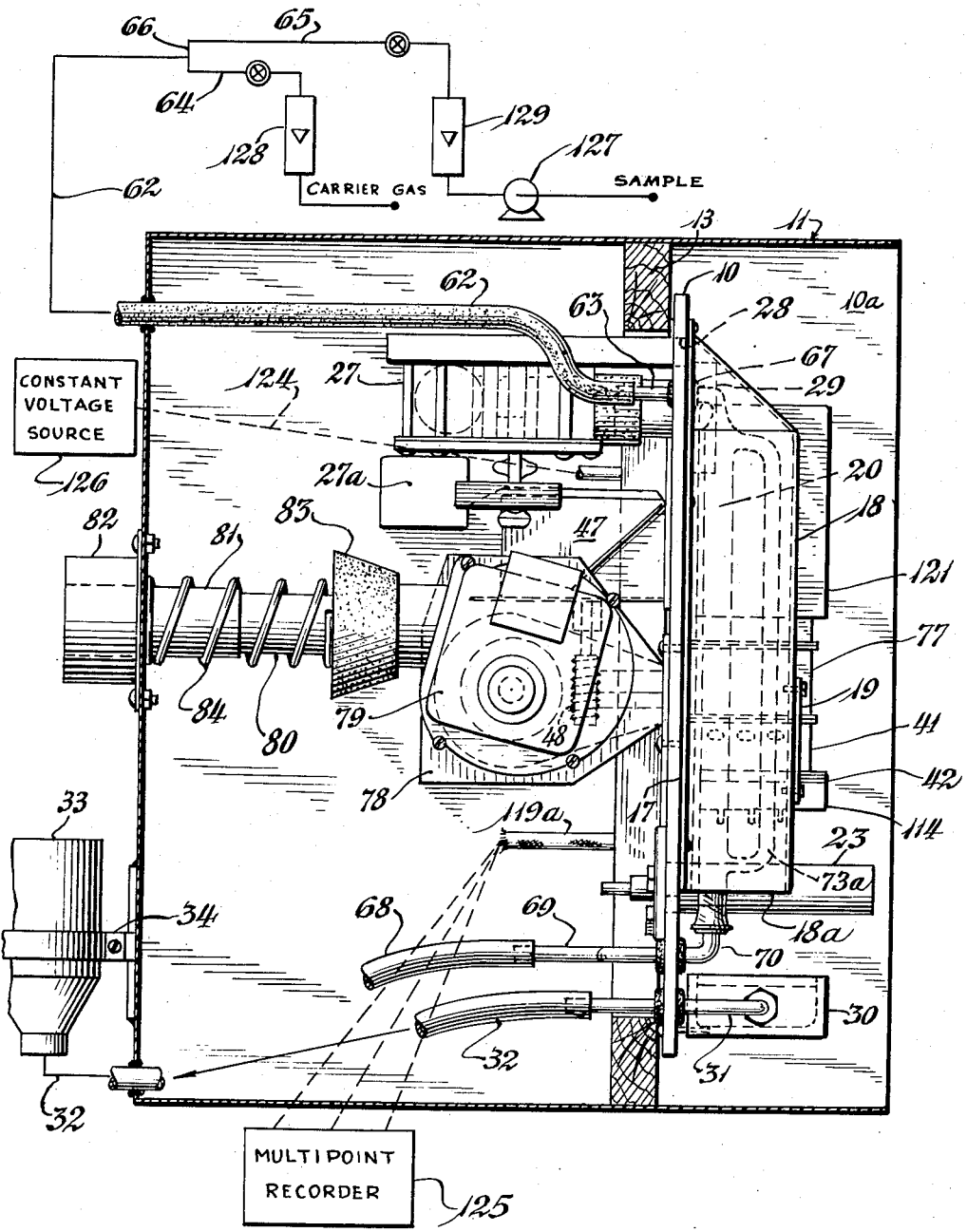

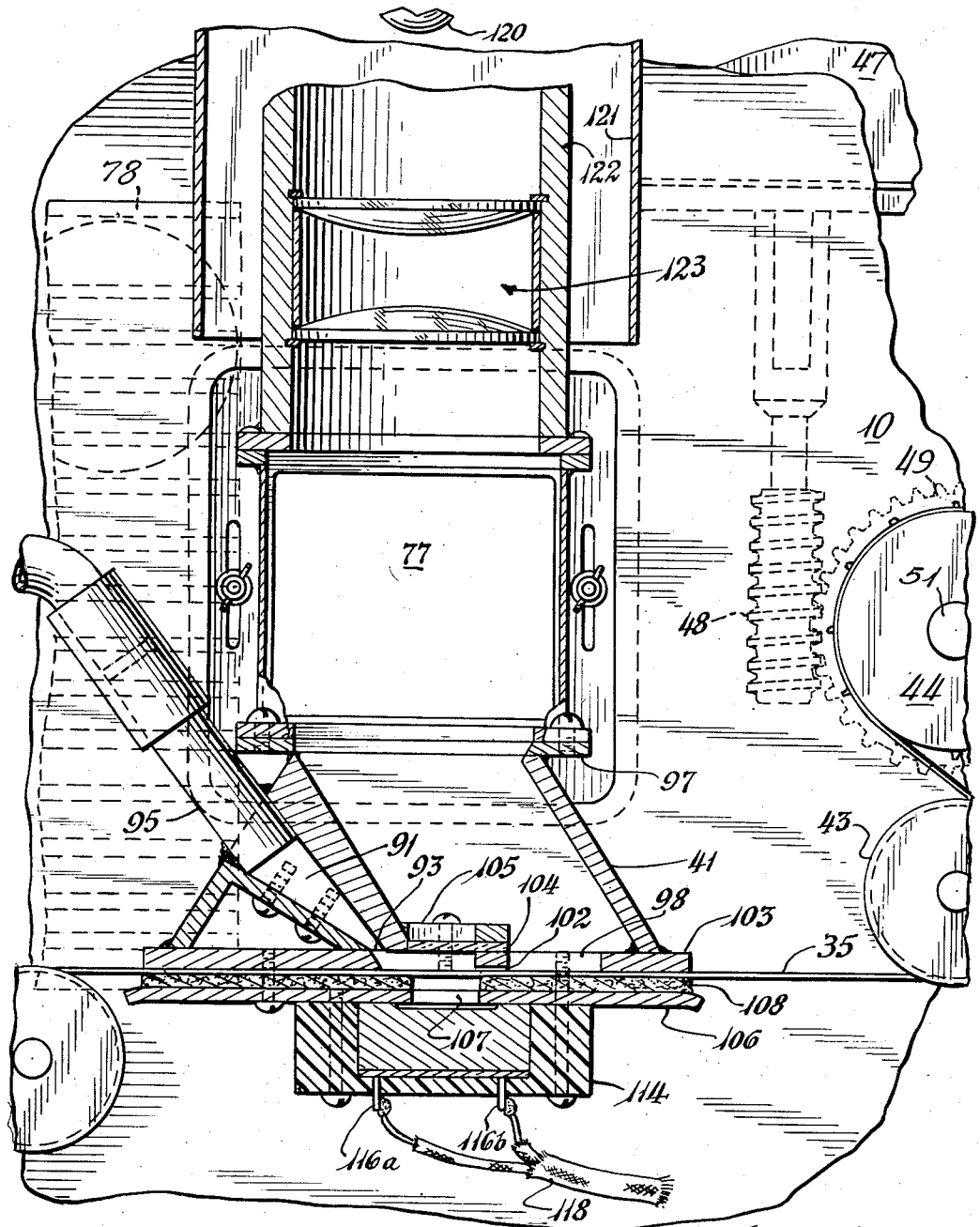

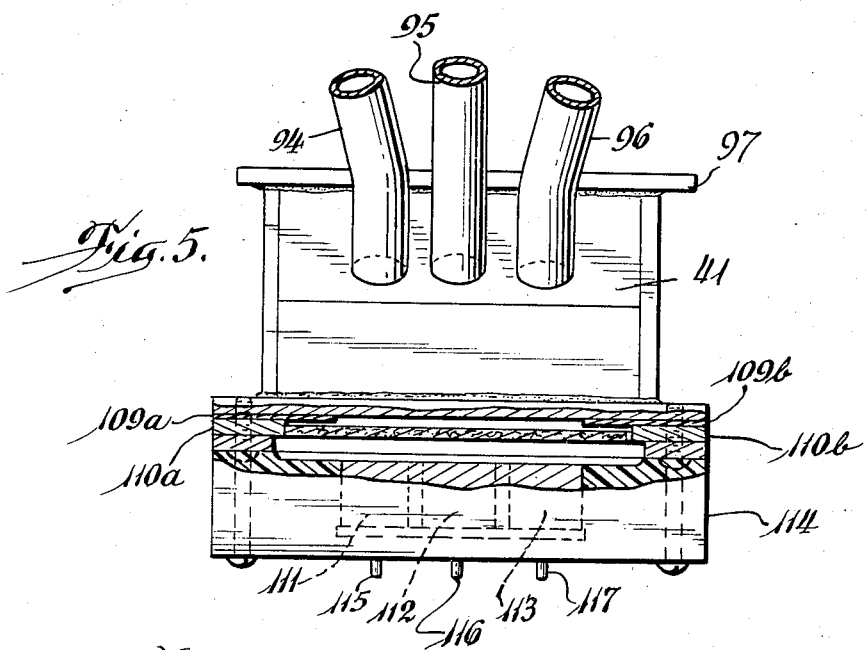
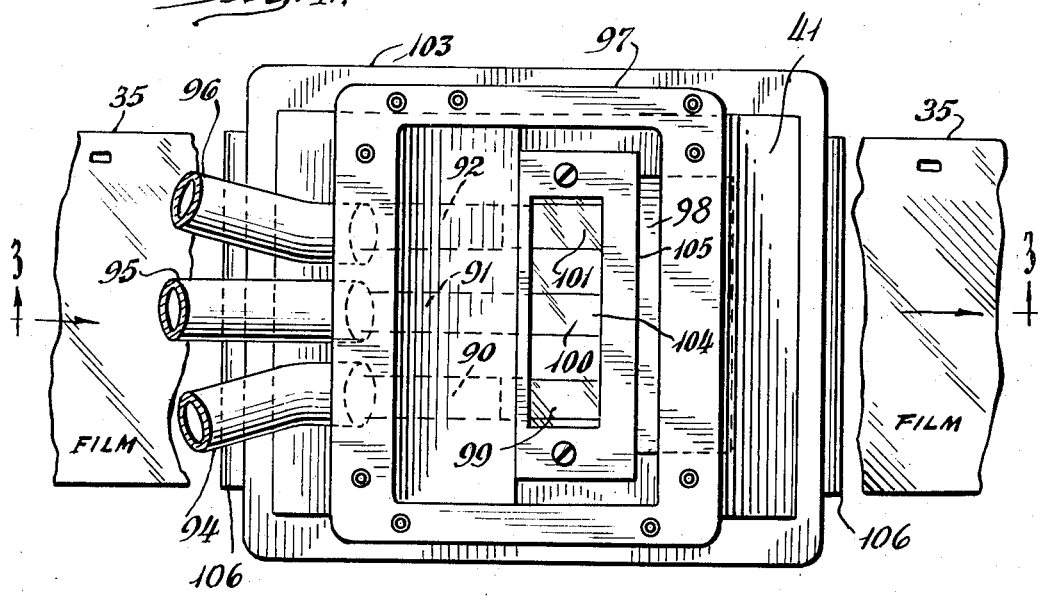

United States Patent Office 2,895,807
Patented July 21, 1959

2,895,807

MULTIPLE STREAM GAS ANALYZER

Leonard V. Sorg, Kansas City, and John C. Lamkin, Independence, Mo., assignors to Standard Oil Company, Chicago, Ill., a corporation of Indiana Application July 22, 1957, Serial No. 673,319

6 Claims. (Cl. 23—255)

This invention relates to a method and means for the continuous detection, indication, and measurement of concentrations of reactive components in an atmosphere. More particularly, the invention pertains to a system for the monitoring of the presence of concentrations of hydrogen sulfide.

The presence of hydrogen sulfide always has been associated with the refining of petroleum either as an original component of the crude oil or as a product of the refining operations. The high toxicity of hydrogen sulfide, a concentration of over 25 p.p.m. in air is considered unsafe, requires its detection in minute quantities. Although the obnoxious odor of hydrogen sulfide initially reveals its presence, it is not a reliable means for registering increases in concentration of the gas. In any event, reliable detection in the range of 0–500 p.p.m. is particularly important because this range covers the accepted upper limit for safety purposes. This places an extraordinary requirement on any system of detection to respond reproducibly and with certainty to such minute changes in concentrations.

Heretofore many attempts have been made to devise systems which would automatically and continuously indicate the presence of hydrogen sulfide in air, but such systems have been inadequate either because they do not give a quantitative result, or because they are inaccurate in the presence of oxygen, or because they were not rapidly sensitive to increases in concentration. It is, therefore, an object of this invention to provide a method and means for indicating quantitatively the presence of hydrogen sulfide in an atmosphere which may contain oxygen. Another object is to provide a system which is rapidly sensitive to increases in concentrations of hydrogen sulfide. It is a further object of our invention to provide an apparatus which is simple in operation and of rugged construction. Another object of our invention is to provide a method and means for continuously and automatically analyzing for hydrogen sulfide directly without interference from other common sulfur-bearing contaminants such as mercaptans and sulfur dioxide. A further object is to provide for the continuous and automatic recording the quantity of hydrogen sulfide present in an atmosphere sample. An additional object of our invention is to provide a system for the detection of hydrogen sulfide which does not require the use of solutions in the detecting functions. Another object is to provide a system which is wholly automatic for the continuous detecting, recording and signaling of hydrogen sulfide concentrations without surveillance by an operator. A further object of the invention is to provide a system which is adapted to monitor a process wherein a reactive gas is a feed to the process, a product of the process, or a by-product of such process. Still another object of the invention is to provide a system wherein several reactive components may be monitored simultaneously.

Briefly, the invention comprises a sampling system, a flow control section, an analyzer section, and a recorder system. The sampling system consists of two sections, the first section being a relatively large sample of a test atmosphere from the source location to the apparatus in a continuous stream. From this stream, the second section of the sampling system selects a small portion of the total stream which is used for the actual analysis.

The stream of gasiform fluid, such as a sample of air, is saturated with water vapor and applied under precise conditions to a moving transparent tape having a transparent-hydrogen-sulfide-sensitive coating or film which darkens in a quantitative manner upon exposure to hydrogen sulfide. Prior to exposure to the sample stream, the film on the tape is pretreated by exposure to humidified air. Means are provided for measuring the extent to which the light transmittancy of the transparent film is reduced as it moves continuously through the exposure chamber. Variations in intensity of a light being transmitted by the exposed tape, which variations are related to the concentration of hydrogen sulfide in an inverse manner, are picked up by a photoelectric cell below the tape. The electrical response from the photoelectric cell is transmitted to a recorder.

The analyzer compartment containing a separate exposure chamber is maintained under controlled temperature conditions and the air within the sealed compartment is circulated so as to maintain the tape and humidifiers also under such uniform temperature conditions. Exhaust means is provided for continuously withdrawing gases from the exposure chamber and thereby prevent their entering into the analyzer compartment.

Further details of our invention are illustrated in the drawings wherein:

Figure 2 is a side view of the compartment showing the arrangement of components on the mounting panel of Figure 1;

Figure 3 is an elevation partly in section of the exposure housing assembly in the analyzer compartment; and Figures 4 and 5 are top and side views, respectively, of the exposure housing assembly of Figure 3.

Figure 1:
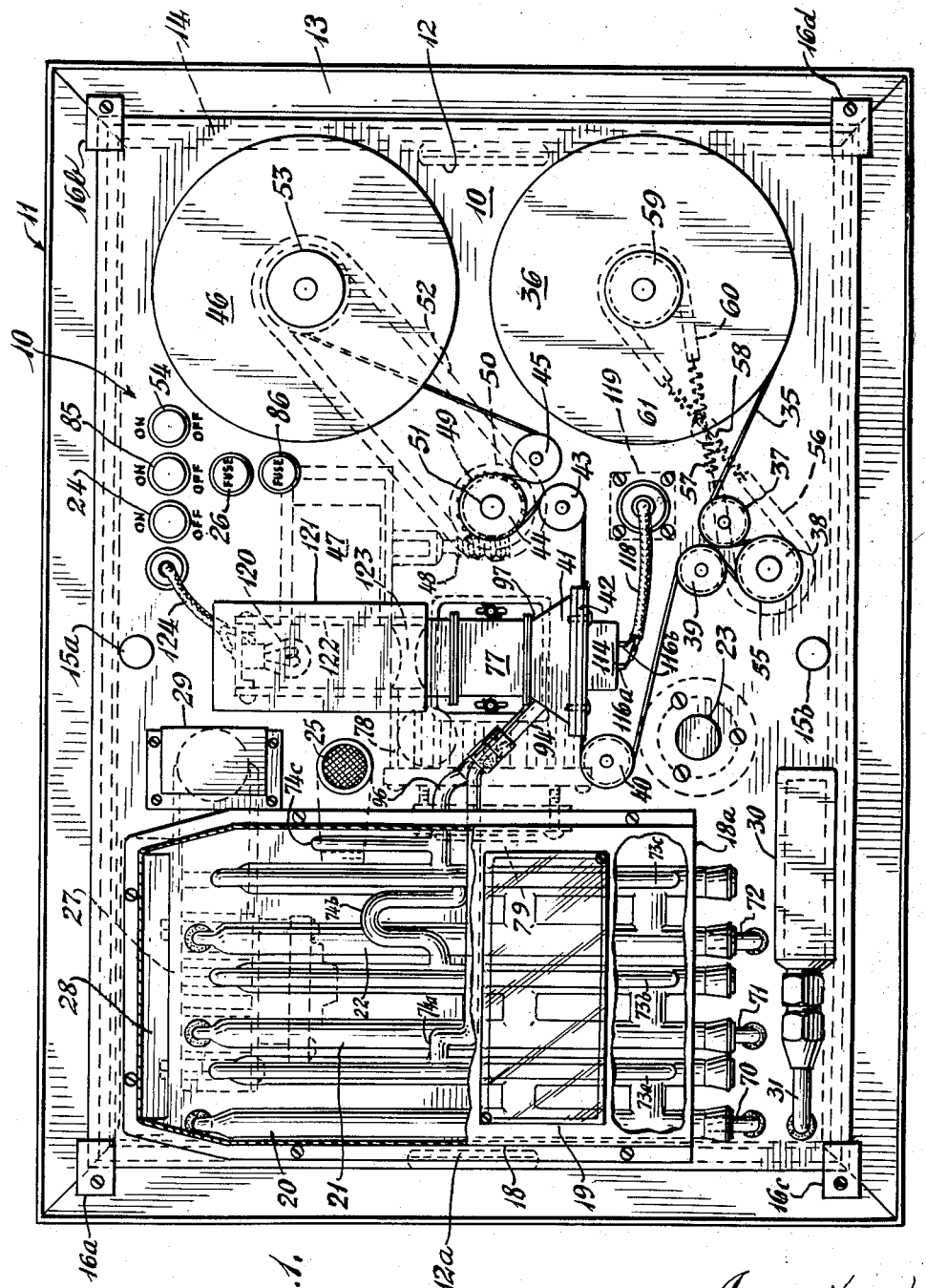
Figure 1 is a detailed elevation illustrating the analyzer compartment of the apparatus.

Referring to the drawings, and in particular to Figures 1 and 2, we have illustrated the analyzer compartment. All parts of the analyzer apparatus are mounted on 3/16 inch aluminum panel 10. It is enclosed within a case or cabinet 11 and is held in place by two slides 12 and 12a at each side of the panel 10. The slides, which are shown in Figure 1, allow the panel 10 to be moved outside the case 11 about three inches to provide access to the rear of the panel 10. When the panel 10 is in its proper position in the case 11, it rests against a frame 13 which has an embedded rubber tubing gasket 14 within the perimeter of the panel 10. The panel 10 is held against the gasket 14 by a series of latches 15a, b and 16a, b, c, d.

The temperature of the cabinet interior is maintained by an electric heater 17 which is located inside the moisturizer tubes 20, 21, and 22. The electrical heater 17 is controlled by a thermo-switch 23 and not only supplies heat to the main panel 10 but also to a 1/8 inch aluminum panel 19 located behind the moisturizer tubes 20, 21, and 22. The heater circuit including the heater 17 and a power source (not shown) is turned on and off through switch 24. Light 25 signals when the heater 17 is on and fuse 26 protects the heater circuit.

Air is circulated through the interior of the case 11 in front of the panel 10 to maintain constant temperature conditions at all points in this space. It is circulated by blower 27 which takes suction through the slot 28 and discharges through vent 29. The bottom 18a of cover 18 is open so that air entering the suction side of blower 27 through slot 28 must pass over moisturizer bath 30 and around the tubes 20, 21, and 22.

We have determined that a humidity of about 30-50% is adequate with about 35% the most satisfactory. A suitable salt solution in bath 30 maintains this humidity. Water is supplied to the moisturizer bath 30 through stainless steel tubing 31 and Tygon tubing 32 from a leveling bottle 33. A 500 ml. leveling bottle 33 attached to the back of the case 11 by adjustable mounting 34 maintains the water level inside the moisturizer bath 30 above the connection between the tubing 31 and the bath 30 for 24 hours.

The film 35 is prepared by applying to a uniformly transparent tape a plastic adsorptive coating such as gelatin or agar agar containing lead acetate and sodium acetate. The tape is of non-reactive, non-porous, non-adsorptive flexible material such as cellulose acetate tape. The tape is first coated with the gelatin layer and then passed across and in contact with the liquid surface of a solution of the lead acetate and sodium acetate whereby the film is coated with a "track" or band of solution. The coated tape is then dried and after winding on reel 36 the film is ready for use.

The solution used for coating is one normal lead acetate and one normal sodium acetate and has a pH of about 6.7. The pH is important because if too much acidity exists, film sensitivity to $H_2S$ is decreased. On the other hand, if the acidity is decreased too much, the lead will precipitate from the coating solution with the result that material such as mercaptan will have a greater effect on the staining of the film. Tests have shown that the effect of mercaptan in concentrations normally present in refinery atmospheres is negligible. No appreciable effect is observed for mercaptans present in the air sample at 30 p.p.m. by weight if the film is prepared as described above. The coating obtained from the defined solution produces stains of greater uniformity, greater optical density for a given concentration of $H_2S$ and low susceptibility to variations in optical density when obtaining indications of $H_2S$ in concentrations greater than about 25 p.p.m. Inasmuch as we use a light beam and photoelectric cell to measure the density of the film stain, a light-sensitive coating cannot be used. The lead acetate-sodium acetate coating described herein is not light-sensitive and retains its transmittancy when exposed to the light beam-photoelectric cell arrangement described herein. Accordingly, the stain obtained on the film 35 is not affected by a change in the transmittancy of the film due to other factors than the presence of $H_2S$.

A tape similar to 35 mm. movie film base stock may be used in our described system. The single analyzer assembly is adapted to receive separate streams from several locations, which record on a multi-band film, and record the concentrations of the individual stains on a conventional multi-point recorder. For example, three separate coating bands may be applied to a broader tape 35 corresponding to a 35 mm. photographic film base, exposed to three separate gas streams in a multiple jet hood and recorded on a single strip chart so that three separate records appear each in a different color. Likewise, different chemical constituents in the same gas sample can be detected, analyzed, and recorded simultaneously by providing each separate constituent with a separate coating band on the transparent tape 35.

The analyzer is able to detect the presence of one p.p.m. of hydrogen sulfide in air. This was done reproducibly in the range of from 1 to about 25 p.p.m. of hydrogen sulfide in air. In the range of about 25 to 50 p.p.m. the reproducibility was in the order of 2 p.p.m. Above this range and up to about 100 p.p.m. the reproducibility was about 5 p.p.m.

The specially prepared film 35 is supplied from 35 mm. reel 36. The film 35 travels from supply reel 36 over 35 mm. pad roller 37, then over tension sprocket 38, then to pad rollers 39 and 40, and thence into the jet housing 41.

The tape or film 35 slides over the film slide plate 42, thence over pad roller 43 to control sprocket 44, thence to pad roller 45 and finally is taken up on the take-up reel 46.

The rate of film travel is controlled by the speed of film-drive motor 47, a worm gear 48 and a spur gear 49 which drives control sprocket 44. The take-up reel 46 is moved by a pulley 50 on the sprocket drive shaft 51, a spring belt 52 and pulley 53. The film-drive motor 47 is turned on and off by switch 54. Tension is maintained on tension sprocket 38 through pulley 55 and leather belt 56 which is attached to spring 57 and anchored to screw 58. Tension is maintained on film-supply reel 36 through a pulley 59, a leather belt 60 and a spring 61 anchored to screw 58. The best rate of film travel was found to be about 3.375 inches/hour.

The sample in lines 65, after being mixed with carrier air from lines 64 passes through simple T tubes 66 and into Tygon tubing 62 and from there into stainless steel tubing 63 which passes through aluminum panel 10, through a rubber grommet 67 and into the H type moisturizing tubes 20, 21, and 22.

Located inside the tubes 20, 21, and 22 are pieces of filter paper which are moistened by water in the bottom of both legs. The water level is held just below the upper cross arms of the tubes by a 500-ml. leveling bottle (not shown), connected to the three tubes by Tygon tubing 68 and stainless steel tubing 69 connected to tubing 70, 71, and 72 extending back of panel 10. The sample passes over the filter paper in the left-hand side, across the top cross-piece and into the right-hand side, thence through the top of the right-hand side and down through a 7 mm. tubing 73a, 73b, 73c into the side arms 74a, 74b, 74c which carry the sample and carrier air into the multi-jets. The side arms 74a, 74b, and 74c of all moisturizing tubes 20, 21, and 22 are the same length so that the travel time inside of the cover plate 18 is the same for all three tubes. From the moisturizing tubes 20, 21, and 22 the sample passes into the three tubes 90, 91, and 92 of the exposure hood 41 which is described in detail below.

After passing through the hood 41, the sample then exits through the exhaust chamber 77, the sample being exhausted by means of a blower 78, which is driven by motor 79, through aluminum tubing 80 which fits snugly into a galvanized nipple 81 which extends through the back side of the case 11 into a 2-inch galvanized conduit 82 for discharge of the exhaust gases away from the instrument. Aluminum tubing 80 is connected to the blower 78 by means of a large rubber stopper 83 held flush against the outlet of the blower 78 by means of a spring 84 which compresses against the stopper 83 and the rear wall of case 11. The 2-inch exhaust conduit 82 is held in place by means of bolts or the like. The circulating blower 27 and exhaust blower 78 are of the same general type and are controlled through switch 85. Film-drive motor 47, exhaust blower motor 79 and circulating blower motor 27a are fused through fuse 86.

The construction of the multi-jet and the multiphotocell housings is shown in Figures 3, 4, and 5.

The three sample jets 90, 91, and 92 are constructed from a single piece of stainless steel and are milled to such dimensions that the orifice at point 93 has a dimension of 1/16 x 1/8 inch. Sample tubes 94, 95, and 96 are silver soldered into the holes drilled in body of housing 41 covered by plate 97.

Located between the exhaust port 98 and jet openings 99, 100, and 101 are three small channels 102, 1/64 inch deep on the lower side of the base plate 103 directly in line with each jet 90, 91, and 92. They allow for the passage of the gases from the jets 90, 91, and 92 to the exhaust system. A glass window 104 held in place by retainer 105 covers all three openings 99, 100, and 101 on the after portion of the jets 90, 91, and 92.

The film slide plate 106 is provided with openings 107 immediately below the portion of the jets 99, 100, and 101 located underneath the window glass 104. Glued to the film slide plate 106 is a piece of billiard cloth 108 to allow for easy sliding of the film 35 across the surface of the plate 103 and to position the film close to the various openings in the base plate 103. Shims 109a and 109b protect the coated portion of the film 35 from touching the base plate 103 and prevent scratching of the film 35 by the jet plate openings 99, 100, and 101. Two 1/16 inch spacers 110a and 110b are located on each side of the base plate 103.

The three photocells 111, 112, and 113 are held in place by a housing 114 mounted to the base plate 103. The leads 115, 116, and 117 from the photocells 111, 112, and 113 extend through the base of the housing 114 and are connected to a multipoint recorder 125 by means of these leads incased in a six-wire cable 118 which plugs into a six-pole receptacle 119 mounted on panel 10. The leads 119a on the back side of the six-pole receptacle 119 are connected through three potentiometers (not shown) to the recorder 125 for the purpose of obtaining the "zero" setting on the recorder.

A light 120 located in housing 121 and mounted on supports 122 is so positioned that the light beam passes through a lens system 123 and is focused on the film 35. Power for the light 120 is supplied through cable 124 from a constant voltage source 126 mounted on the back of the case 11.

The analytical sample in line 65 is pumped through the analyzer by means of a pump 127 and an auxiliary or diluent carrier air stream, free of contaminants, can be introduced by line 64 for mixture with the analytical sample in line 65. The carrier air in line 64 and the sample stream in line 65 are metered at definite rates into the analyzer by flow meters 128 and 129, respectively, into T 66 and thence into line 62. This arrangement permits control of range of concentration to be monitored since the air-sample ratio may be varied, thus changing the effective range of the instrument. In addition, this arrangement provides a purge medium to sweep the analytical sample through the instrument lines, thereby reducing any lag in response to changes in the hydrogen sulfide content of the sample stream. A larger metered flow of sample plus carrier gas provides better "jet" action at the film exposure jets 90, 91, and 92 within the exposure chamber 41, thereby assuring more uniform film stains.

A stain is formed immediately on the film carried by the tape 35 as it passes under the multi-jets 90, 91, and 92 in the exposure chamber 41. The optical density of the stain varies as a function of the concentration of the reactive component in the analytical sample stream. An important feature of the system is the provision of the means for controlling the humidity within the analyzer cabinet 11. By controlling the humidity conditions we can temper the film 35 so as to make it speedily reactive and supersensitive to the presence of hydrogen sulfide in the analytical sample stream. By including the saturated salt solution bath 30 within the analyzer cabinet 11 we can controllably maintain a relative humidity of about 50% for the selected temperature. The temperature of the analyzer compartment 11 is maintained at a constant level in the range of 100–120° F. by providing the electrical heater panel-radiator and the air circulation system whereby uniform temperature and humidity is uniquely maintained throughout all parts of the analyzer cabinet 11.

Extensive tests performed on the hydrogen sulfide analyzer-recorder using the constant humidity device indicated above have proved that the film operates with maximum sensitivity and in the absence of cut off effect by maintaining the relative humdity in the range of 30 to 50 percent. If the relative humidity is increased much above this amount, the film becomes tacky, has a tendency to stick on rollers and in the reels. If the relative humidity gets much below 30 percent the film loses sensitivity and is slow in response. On the basis of these data it is desirable to maintain the relative humidity in the range of about 30 to 50 percent and the use of the sodium chromate saturated salt solution provides the necessary means for doing it.

The use of the saturated sodium chromate salt solution controls the relative humidity of the cabinet 11 to a desired 50 percent level. In this application a small trough 30 is attached to the panel 10 of the instrument. This trough 30 is connected by means of tubing 32 to the liquid leveling bottle 33 in which saturated sodium chromate solution is retained.

Within the trough 30 itself, which is open at the top, crystals of sodium chromate are placed. This assures saturation at all times. The positioning of the bath 30 as shown in the circulating air stream, maintains the temperature of the solution at 110° F., thus assuring desired relative humidity in the cabinet. Numerous tests have been performed in the cabinet 11 to determine the relative humidity and we find actually it is controlled wtihin the precision desired. The position of the bath 30 below the hood 18 is particularly chosen so as to humidify the air which circulates over the film 35.

Although our invention has been described in connection with the detection and recording of $H_2S$ on a continuously moving film, the invention is not limited to $H_2S$. The essential factor is a reactant wherein optical density is related reproducibly to concentration, and other gases on which this instrument can be applied include sulfur dioxide, sulfur trioxide, and the like. Thus, with the proper choice of reactive traces on the transparent tape, our analyzer can be made to detect, record and control any gas-phase process.

From the description herein it will be apparent that we have attained the objects of our invention and have provided a method and means for the continuous and accurate measurement and recording of $H_2S$ concentrations. However, the detailed description of a preferred embodiment of our invention is intended as an illustration only and, accordingly, it is contemplated that changes and modifications can be made in the described system without departing from the scope of the invention.

What we claim is:

1. An apparatus for detecting the concentration of a chemically reactive component in a gasiform stream wherein a moving tape is exposed to such stream and the extent of change in the light transmittancy of the tape is a measure of the concentration of the reactive component in such a stream, the improvement which comprises a clear, non-absorptive gas-impermeable tape, a water absorptive coating thereon, a plurality of traces on said coating specifically reactive to a component to be measured, an exposure chamber through which said tape is caused to travel, a plurality of jet inlet means directing streams of gasiform fluids within the exposure chamber, cabinet means enclosing said exposure chamber and unexposed tape, a heat radiating panel in said cabinet means supporting said exposure chamber, means for controlling the humidity within the said cabinet whereby said traces are sensitized with water vapor prior to passage through said exposure chamber, said means for controlling the humidity comprising trough means in heat conducting relation to said panel, and a replenished pool of saturated salt solution in said trough, photoelectric means providing a light beam on one side of said tape and a light-sensitive means on the other side, and means responsive to changes in the light transmittancy of said tape immediately after exposure to said reactive component.

2. The apparatus including a cabinet enclosing a test chamber and a detection means, heat radiating panel means in said cbainet, said panel means supporting said test chamber and said detection means, and a humidifying liquid reservoir fixed to a lower portion of said radiating panel means in heat exchange relationship therewith whereby the humidity of the cabinet is controlled for the selected temperature of the cabinet heated by said panel means.

3. The apparatus of claim 1 wherein said pool in said trough is a saturated aqueous solution of sodium chromate, and said panel is adapted to maintain said trough at about 110° F.

4. The apparatus of claim 1 wherein said means for controlling the humidity includes liquid leveling reservoir means for said trough, a flexible conduit connected between said reservoir and said trough, and means for vertically positioning said reservoir relative to said trough.

5. The apparatus of claim 2 wherein said reservoir is a trough, liquid leveling means for said trough including a vertically adjustable liquid supply container, and a flexible tubular conduit connected from said container to said trough.

6. The apparatus of claim 2 wherein the humidifying liquid in said reservoir is a saturated aqueous solution of sodium chromate, and said panel is adapted to maintain said reservoir and the solution therein at about 110° F.

References Cited in the file of this patent

UNITED STATES PATENTS

| | | |
|---|---|---|
| 936,957 | Thompson et al. | Oct. 12, 1909 |
| 2,044,284 | Dargavel | June 16, 1936 |
| 2,551,281 | Moses et al. | May 1, 1951 |
| 2,800,397 | Offutt et al. | July 23, 1957 |

UNITED STATES PATENT OFFICE
CERTIFICATE OF CORRECTION

Patent No. 2,895,807                                          July 21, 1959

Leonard V. Sorg et al.

It is hereby certified that error appears in the printed specification of the above numbered patent requiring correction and that the said Letters Patent should read as corrected below.

Column 2, line 60, after "moisturizer" insert -- 18 and immediately behind heater panel 19 and moisturizer --; column 6, line 23, for "wtihin" read -- within --; line 74, for "cbainet" read -- cabinet --.

Signed and sealed this 17th day of May 1960.

(SEAL)
Attest:

KARL H. AXLINE                                                  ROBERT C. WATSON
Attesting Officer                                         Commissioner of Patents